(12) United States Patent
Worley, III et al.

(10) Patent No.: US 9,418,479 B1
(45) Date of Patent: Aug. 16, 2016

(54) QUASI-VIRTUAL OBJECTS IN AN AUGMENTED REALITY ENVIRONMENT

(75) Inventors: William Spencer Worley, III, Half Moon Bay, CA (US); Jonathan Betts-LaCroix, Belmont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 676 days.

(21) Appl. No.: 12/977,876

(22) Filed: Dec. 23, 2010

(51) Int. Cl.
*G09G 5/00* (2006.01)
*G06T 19/00* (2011.01)

(52) U.S. Cl.
CPC .................... *G06T 19/006* (2013.01)

(58) Field of Classification Search
CPC .................................................. G06T 19/006
USPC .................................................. 345/629–641
See application file for complete search history.

(56) References Cited

U.S. PATENT DOCUMENTS

| | | | | |
|---|---|---|---|---|
| 5,528,232 | A * | 6/1996 | Verma et al. | 340/8.1 |
| 6,709,116 | B1 * | 3/2004 | Raskar et al. | 353/121 |
| 7,069,516 | B2 * | 6/2006 | Rekimoto | 715/757 |
| 7,073,129 | B1 * | 7/2006 | Robarts et al. | 715/740 |
| 7,084,887 | B1 * | 8/2006 | Sato et al. | 345/633 |
| 7,248,715 | B2 * | 7/2007 | Levy | 382/100 |
| 7,394,459 | B2 * | 7/2008 | Bathiche et al. | 345/175 |
| 7,418,392 | B1 | 8/2008 | Mozer et al. | |
| 7,654,826 | B2 * | 2/2010 | Faulkner et al. | 434/130 |
| 7,720,683 | B1 | 5/2010 | Vermeulen et al. | |
| 7,774,204 | B2 | 8/2010 | Mozer et al. | |
| 7,826,641 | B2 * | 11/2010 | Mandella et al. | 382/106 |
| 2002/0191004 | A1 * | 12/2002 | Ebersole et al. | 345/633 |
| 2007/0247422 | A1 * | 10/2007 | Vertegaal et al. | 345/156 |
| 2008/0224837 | A1 * | 9/2008 | Meyer | B60Q 9/005 340/435 |
| 2012/0223885 | A1 | 9/2012 | Perez | |

FOREIGN PATENT DOCUMENTS

WO    WO2011088053 A2    7/2011

OTHER PUBLICATIONS

Mistry et al., WUW—Wear Ur World—A Wearable Gestural Interface, Conference on human Factors in Computing Systems 2009, Apr. 2009, pp. 4111-4116.*

Kato et al., Virtual Object Manipulation on a Table-Top AR Environment, Proceedings of the IEEE and ACM International Symposium on Augmented Reality 2000, Oct. 2000, pp. 111-119.*

Raskar et al., The Office of the Future: A Unified Approach to Image-Based Modeling and Spatially Immersive Displays, SIGGRAPH 1998 Proceedings of the 25th Annual Conference on Computer Graphics and Interactive Techniques, Jul. 1998.*

White et al., Visual Hints for Tangible Gestures in Augmented Reality, Proceedings of the 2007 6th IEEE and ACM International Symposium on Mixed and Augmented Reality, Nov. 2007.*

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Charles Tseng
(74) *Attorney, Agent, or Firm* — Lee & Hayes, PLLC (57) ABSTRACT

A virtual overlay alters the appearance of a quasi-virtual object within an augmented reality environment. This quasi-virtual object may display information to the user, accept input from the user via motions or physical interactions between the user and the object, or both. Quasi-virtual objects allow a virtual object to have a physical manifestation within the augmented reality environment.

29 Claims, 10 Drawing Sheets

QUASI-VIRTUAL OBJECTS IN AN AUGMENTED REALITY ENVIRONMENT

BACKGROUND

Augmented reality allows interaction among users and real-world objects and virtual or computer-generated objects and information within an augmented reality environment. Within the augmented reality environment, interactions may include electronic input, verbal input, physical input relating to the manipulation of physical objects, and so forth.

Virtual objects may be readily changed. For example, images may be quickly changed, sounds may be added or removed, and so forth. However, traditional physical objects within the augmented reality environment are immutable compared to the easily changed virtual objects. Where the physical objects are part of the augmented reality, this fixed and immutable nature of the physical objects has traditionally limited their use. What is desired is a way to provide physical objects within the augmented reality environment which may have their appearance easily altered so they appear to be, and act, within the augmented reality environment as various physical objects.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

An augmented reality system may be configured to interact with objects within a scene and generate an augmented reality environment. The augmented reality environment allows for virtual objects and information to merge and interact with real-world objects, and vice versa. Disclosed herein are quasi-virtual objects and techniques and devices suitable for implementing them, such as within an augmented reality environment.

Quasi-virtual objects (QVOs) are physical objects configured for use within the augmented reality environment. The QVOs may be used for presentation of information, as input devices, or as a combination thereof. The QVOs are configured to present a virtual overlay, or image, such that their appearance within the augmented reality environment is changeable. For example, a spherical QVO may have different virtual overlays applied such that its appearance varies from a map globe, the planet Jupiter, the nucleus of a cell, or a coconut. Within the augmented reality environment, the motion of the QVO, the user's motion relative to the QVO, or both, may act as input. For example, a swiping motion of a hand or finger gesture proximate to the surface of the spherical QVO may be interpreted as an input to rotate the map globe. Thus, virtual overlays may also provide for virtual controls which may be activated by the user.

As described herein for illustration and not by way of limitation, the augmented reality input and output may be provided at least in part by a combination of an image projector configured to generate structured light patterns and a camera to image those patterns. The projector and camera may further be incorporated into a single unit and designated as an augmented reality functional node (ARFN). In other implementations, other configurations of one or more projectors and one or more cameras may be used, and other sensors such as microphones, ultrasound transducers, and so forth may be also be present within or coupled to the ARFN.

In one implementation, the virtual overlay may be presented on the QVO by way of a projected image from the image projector. In another implementation, the QVO may be configured with a display system such that the virtual overlay may be presented by the QVO itself.

Within the augmented reality environment, the ARFN includes an augmented reality module. This module is configured to identify and track QVOs within the scene and generate virtual overlays for the QVOs. The use of QVOs does not preclude entirely virtual objects which may be presented via image projection, holography speakers, and so forth. The augmented reality environment may therefore incorporate virtual objects as well as QVOs.

Illustrative Environment

Figure 1:
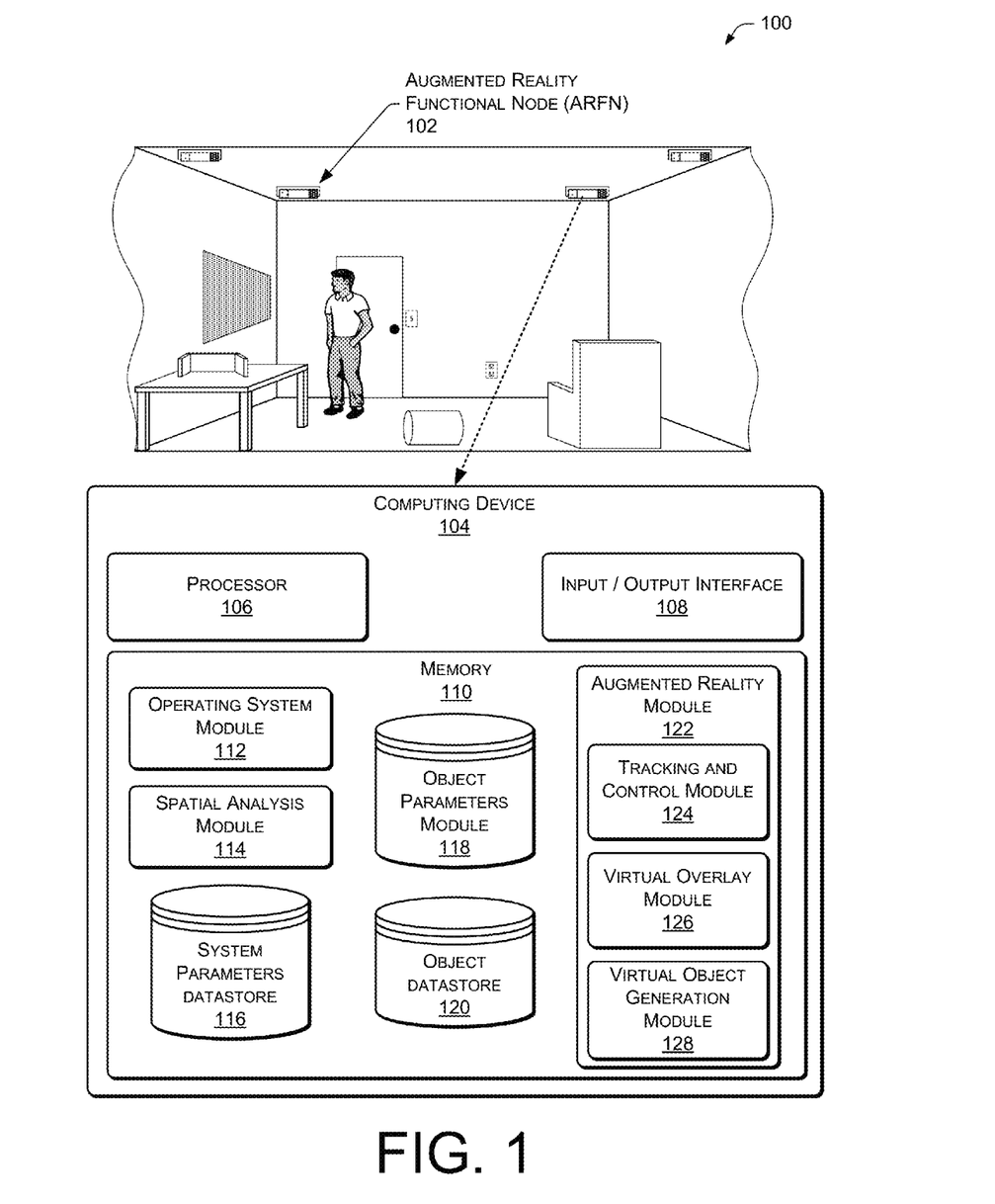
FIG. 1 shows an illustrative scene within an augmented reality environment which includes with an augmented reality functional node with associated computing device and a virtual overlay module for use with quasi-virtual objects.

FIG. 1 shows an illustrative augmented reality environment 100 which includes an augmented reality functional node (ARFN) 102 with associated computing device. In this illustration, multiple ARFNs 102 are positioned in the corners of the ceiling of the room. In other implementations, the ARFN 102(s) may be positioned in other locations within the scene. When active, the ARFN 102 may generate an augmented reality environment incorporating the scene. In some implementations, more or fewer ARFNs 102 may be used.

The ARFN 102 is coupled to a computing device 104. This computing device 104 may be within the ARFN 102, or disposed at another location and connected to the ARFN 102. The computing device 104 comprises a processor 106, an input/output interface 108, and a memory 110. The processor 106 may comprise one or more processors configured to execute instructions. The instructions may be stored in memory 110, or in other memory accessible to the processor 106.

The input/output interface 108 may be configured to couple the computing device 104 to other components such as projector, cameras, microphones, other ARFNs 102, other computing devices, and so forth. The coupling between the computing device 104 and the devices may be via wire, fiber optic cable, or wireless connection.

The memory 110 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the memory 110 and configured to execute on a processor, such as the processor 106. An operating system module 112 is configured to manage hardware and services within and coupled to the computing device 104 for the benefit of other modules. Modules may be stored in the memory of the ARFN 102, storage devices accessible on the local network, or cloud storage accessible via a wide area network.

A spatial analysis module 114 is configured to perform several functions which may include analyzing a scene to generate a topology, recognizing objects in the scene, dimensioning the objects, and modeling the scene. Characterization may be facilitated using several technologies including structured light, light detection and ranging (LIDAR), optical time-of-flight, ultrasonic ranging, stereoscopic imaging, radar, and so forth either alone or in combination with one another. For convenience, and not by way of limitation, the examples in this disclosure refer to structured light. The spatial analysis module 114 may receive data from input and output components, such as described below with regards to FIG. 2.

A system parameters datastore 116 is configured to maintain information about the state of the computing device 104, the input/output devices of the ARFN 102, and so forth. For example, system parameters may include current pan and tilt settings of the cameras and projectors. As used in this disclosure, datastore includes lists, arrays, databases, and other data structures used to provide storage and retrieval of data.

An object parameters datastore 118 in the memory 110 is configured to maintain information about the state of objects within the scene. This information may be acquired from the ARFN 102, other input devices, or via manual input. For example, the object parameters may include the surface contour of the object and the overall reflectivity determined from the object's interaction with the structured light pattern.

An object datastore 120 is configured to maintain information about reference objects. This information may include assumptions about the object, dimensions, and so forth. For example, the object datastore 120 may include a reference object of a particular model of QVO and include the assumptions that QVO is either held by a user or sits on a surface, and is not present on walls or ceilings. The spatial analysis module 114 may use this data for tracking, to test dimensional assumptions, and so forth. The object datastore 120 may include a library of pre-loaded reference objects, as well as objects which are temporally persistent within a particular environment, such as a wall, particular table, user and so forth. The object datastore 120 may be stored on one or more of the memory of the ARFN 102, storage devices accessible on the local network, or cloud storage accessible via a wide area network.

An augmented reality module 122 is configured to generate augmented reality output in concert with the physical environment. A tracking and control module 124 is configured to identify objects, including QVOs within the scene and track their position and in some implementations, orientation. Once the QVO has been identified, a virtual overlay module 126 may be configured to generate and present the virtual overlay upon the QVO. The augmented reality module 122 may access input/output devices within one or more ARFN nodes 102 to generate output, receive input, or both.

While interacting with the augmented reality environment, users may inadvertently and adversely interact with physical objects in the scene. The augmented reality module 122 may be configured to provide hazard avoidance to mitigate or eliminate adverse interactions. This hazard avoidance modifies the augmented reality environment to guide one or more users away from one or more physical hazards within the scene. For example, zones designated for input may be shifted away from objects on the floor which may pose tripping hazards. Zones for accepting gestures may be configured to avoid having a user's hand hit a lamp or chandelier. Quasi-virtual objects may be configured to have their virtual overlays deactivate when within a pre-determined distance of staircases. The active zones for multiple users to enter data may be separated to prevent inadvertent contact. Such modification of the augmented reality environment thus serves to minimize injury or damage to the user or items in the environment.

In one implementation, the modification to the augmented environment may include "fading" the augmented reality environment as the user approaches a physical hazard. For example, while standing in the middle of the scene away from any objects, the user may see projected images at normal brightness levels and hear audio at volume. However, as the user approaches a hazard such as the chair or a staircase, the brightness and volume may be decreased. This provides a minimally intrusive enticement for the user to interact with the augmented reality environment from a relatively hazard-free location.

In another implementation, the modification to the augmented reality environment may include applying a cautionary virtual overlay to at least a part of the physical hazard. For example, an animated red border may be placed around the object sitting on the floor or around a staircase. In additional to the visual warning described above, auditory, haptic, and so forth may also be used to warn or direct the users.

The tracking and control module 124 is configured to identify objects, including QVOs within the scene and track their position. In some implementations, orientation of the QVOs may also be determined. The tracking and control module 124 may utilize data obtained by the spatial analysis module 114. The tracking and control module 124 is discussed below in more detail in FIG. 4.

The virtual overlay module 126 is configured to generate and present the virtual overlay upon the QVO which is being monitored by the tracking and control module 124. The virtual overlay changes the appearance of the QVO. The virtual overlay module 126 is discussed below with in more detail in FIG. 5.

A virtual object generation module 128 is configured to generate virtual objects within the augmented reality environment which have no associated physical presence. For example, the virtual object generation module 128 may generate a picture of a landscape on a wall, or a checklist.

Figure 2:
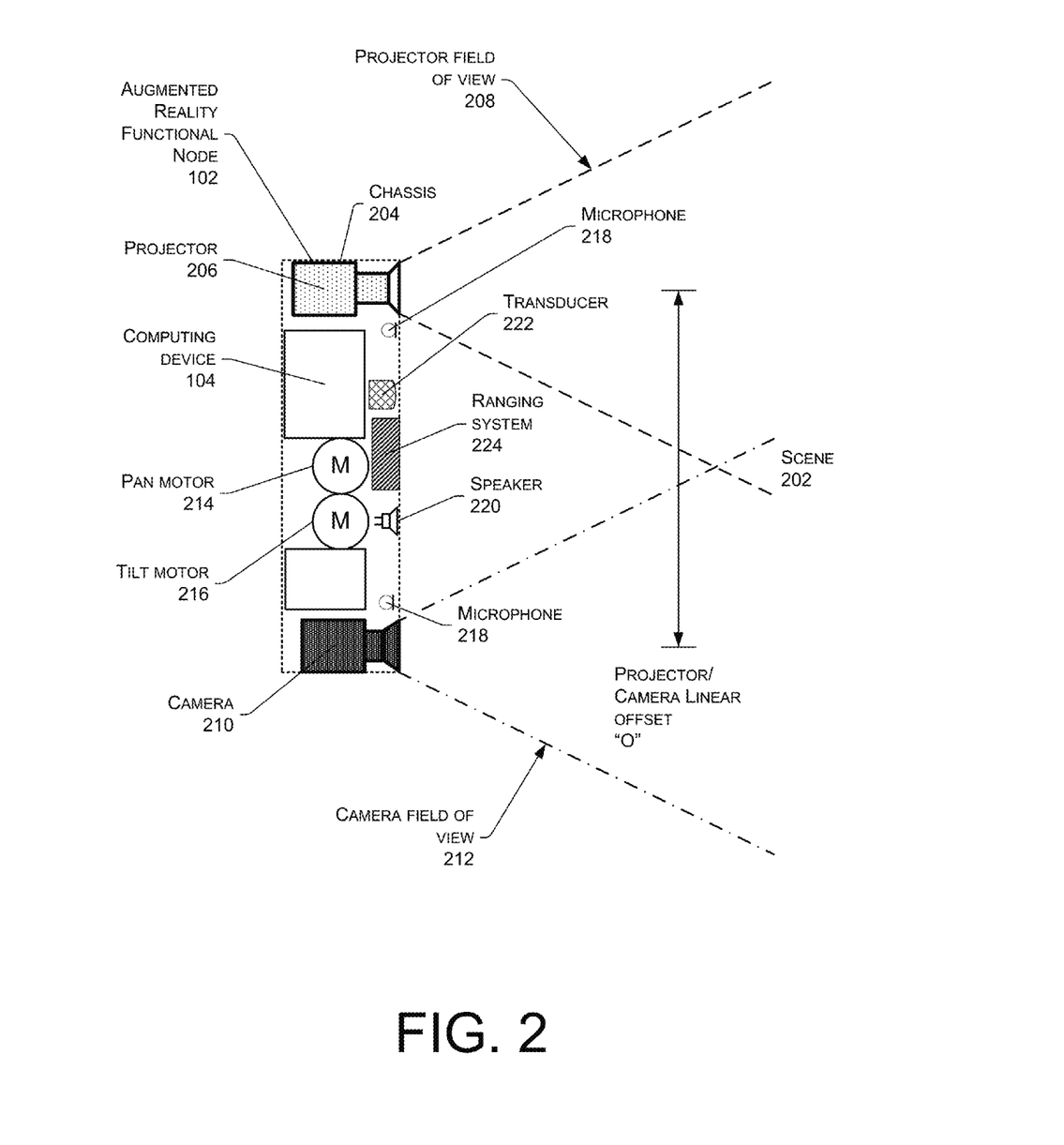
FIG. 2 shows an illustrative augmented reality functional node and selected components.

FIG. 2 shows an illustrative schematic 200 of the augmented reality functional node 102 and selected components. The ARFN node 102 is configured to scan at least a portion of a scene 202 and the objects therein. The ARFN 102 may also be configured to provide output.

A chassis 204 is configured to hold the components of the ARFN 102. Within the chassis may be disposed a projector 206. The projector 206 is configured to generate images. These images may be visible light images perceptible to the user, visible light images imperceptible to the user, images with non-visible light, or a combination thereof. This projector 206 may comprise a digital micromirror device (DMD), liquid crystal on silicon display (LCOS), liquid crystal display, 3LCD, and so forth configured to generate an image and project it onto a surface within the environment. For example, as described herein, the projector may be configured to project the virtual overlay onto the QVO.

The projector 206 has a projector field of view 208 which describes a particular solid angle. The projector field of view 208 may vary according to changes in the configuration of the projector. For example, the projector field of view 208 may narrow upon application of an optical zoom to the projector. In some implementations a plurality of projectors 206 may be used.

A camera 210 may also be disposed within the chassis 204. The camera 210 is configured to image the scene in visible light wavelengths, non-visible light wavelengths, or both. The camera 210 has a camera field of view 212 which describes a particular solid angle. The camera field of view 212 may vary according to changes in the configuration of the camera 210. For example, an optical zoom of the camera may narrow the camera field of view 212. In some implementations a plurality of cameras 210 may be used.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. The actuator may comprise a pan motor 214, tilt motor 216, and so forth. The pan motor 214 is configured to rotate the chassis 204 in a yawing motion. The tilt motor 216 is configured to change the pitch of the chassis 204. By panning and/or tilting the chassis 204, different views of the scene may be acquired. The spatial analysis module 114 may use the different views to monitor objects within the environment.

One or more microphones 218 may be disposed within the chassis 204, or elsewhere within the scene. These microphones 218 may be used to acquire input from the user, for echolocation, location determination of a sound, or to otherwise aid in the characterization of and receipt of input from the scene. For example, the user may make a particular noise such as a tap on a wall or snap of the fingers which are pre-designated as inputs within the augmented reality environment. The user may alternatively use voice commands. Such audio inputs may be located within the scene using time-of-arrival differences among the microphones and used to summon an active zone within the augmented reality environment.

One or more speakers 220 may also be present to provide for audible output. For example, the speakers 220 may be used to provide output from a text-to-speech module or to playback pre-recorded audio.

A transducer 222 may be present within the ARFN 102, or elsewhere within the environment, and configured to detect and/or generate inaudible signals, such as infrasound or ultrasound. These inaudible signals may be used to provide for signaling between accessory devices and the ARFN 102.

A ranging system 224 may also be provided in the ARFN 102. The ranging system 224 is configured to provide distance information from the ARFN 102 to a scanned object or set of objects. The ranging system 224 may comprise radar, light detection and ranging (LIDAR), ultrasonic ranging, stereoscopic ranging, and so forth. In some implementations the transducer 222, the microphones 218, the speaker 220, or a combination thereof may be configured to use echolocation or echo-ranging to determine distance and spatial characteristics.

In this illustration, the computing device 104 is shown within the chassis 204. However, in other implementations all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof.

Also shown in this illustration is a projector/camera linear offset designated "O". This is a linear distance between the projector 206 and the camera 210. Placement of the projector 206 and the camera 210 at distance "O" from one another aids in the recovery of structured light data from the scene. The known projector/camera linear offset "O" may also be used to calculate distances, dimensioning, and otherwise aid in the characterization of objects within the scene 202. In other implementations the relative angle and size of the projector field of view 208 and camera field of view 212 may vary. Also, the angle of the projector 206 and the camera 210 relative to the chassis 204 may vary.

In other implementations the components of the ARFN 102 may be distributed in one or more locations within the environment 100. As mentioned above, microphones 218 and speakers 220 may be distributed throughout the scene. The projector 206 and the camera 210 may also be located in separate chassis 204. The ARFN 102 may also include discrete portable signaling devices used by users to issue inputs. For example, these may be acoustic clickers (audible or ultrasonic), electronic signaling devices such as infrared emitters, radio transmitters, and so forth.

Figure 3:
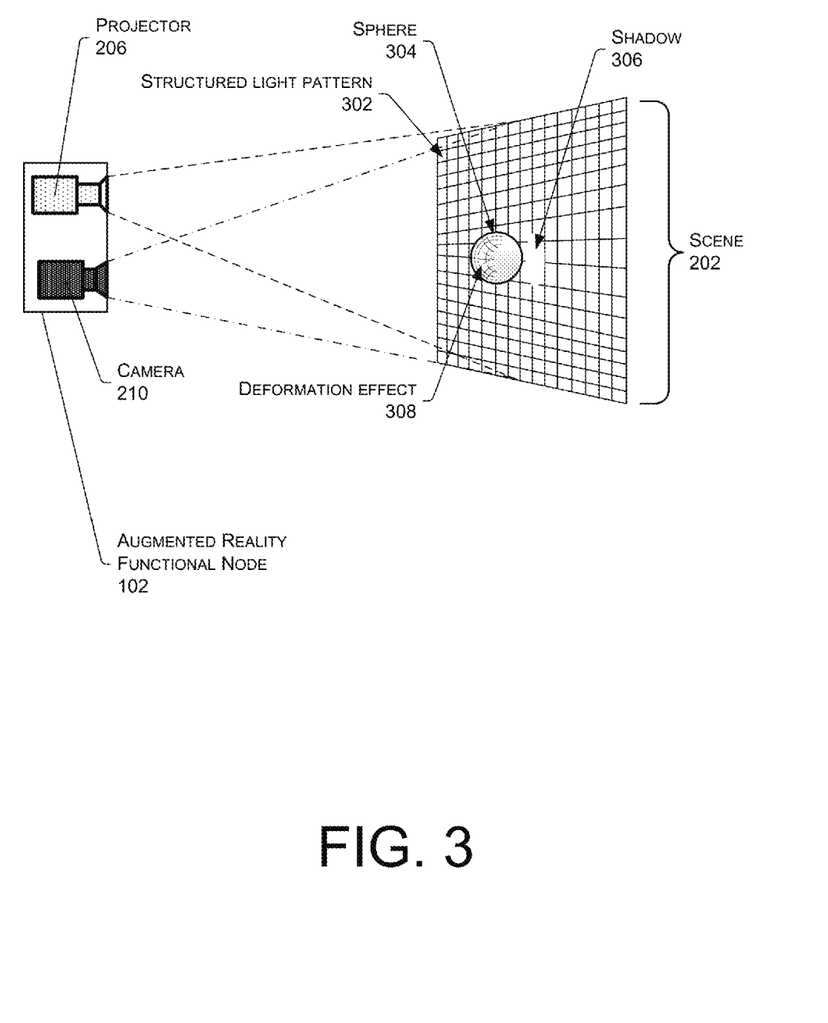
FIG. 3 illustrates the augmented reality functional node projecting a structured light pattern on a scene and receiving a corresponding image of the scene.

FIG. 3 illustrates a structured light pattern 300 impinging on the scene. In this illustration, the projector 206 within the ARFN 102 projects a structured light pattern 302 onto the scene 202. In some implementations a sequence of different structure light patterns 302 may be used. This structured light pattern 302 may be in wavelengths which are visible to the user, non-visible to the user, or a combination thereof. The structured light pattern 304 is shown in this example, but not by way of limitation, as a grid. In other implementations other patterns, such as bars, dots, pseudorandom noise, and so forth may be used. Pseudorandom noise (PN) patterns are particularly useful because a particular point within the PN pattern may be specifically identified. A PN function is deterministic in that given a specific set of variables, a particular output is defined. This deterministic behavior allows the specific identification and placement of a point or block of pixels within the PN pattern.

A sphere 304 is shown positioned between the projector 206 and a wall in the scene 202. A shadow 306 from the sphere 304 appears on the wall. Inspection of the sphere 304 shows a deformation effect 308 of the structured light pattern 302 as it interacts with the curved surface of the sphere 304.

In some implementations other effects, such as dispersion of the structured light pattern 302 may be used to provide information on the topology of the scene. Where the projector 206 and camera 210 have differing fields of view, such as shown in FIG. 2, the dispersion or change in the "density" of the structured light pattern 302 may be used to determine depth of field.

The camera 210 detects the interaction of the structured light pattern 302 with objects within the scene. For example, the deformation effect 308 on the sphere 304 is detected by the camera 210. The camera 210 is configured to sense or detect the structured light. In some implementations the camera 210 may also sense or detect wavelengths other than those used for structured light pattern 302. The image captured by the camera 210 is processed by the spatial analysis module 114 to characterize the scene 202. In some implementations, multiple cameras may be used to acquire the image.

The actual size of the sphere 304 in this example may not be readily determined based upon the geometry of the ARFN 102, diameter of the sphere 304, distance between the ARFN 102 and the sphere 304, and so forth. As a result, the spatial analysis module 114 may be configured to make one or more assumptions about the scene, and test those assumptions to constrain the dimensions of the scene 202.

Where the sphere 304 is a QVO, information about the size of the object may be accessed from the object datastore 120 or from the object itself. For example, the QVO may have a watermark which encodes the dimensions of the object. Watermarking is described below in more detail with regards to FIG. 4.

Illustrative Modules

Figure 4:
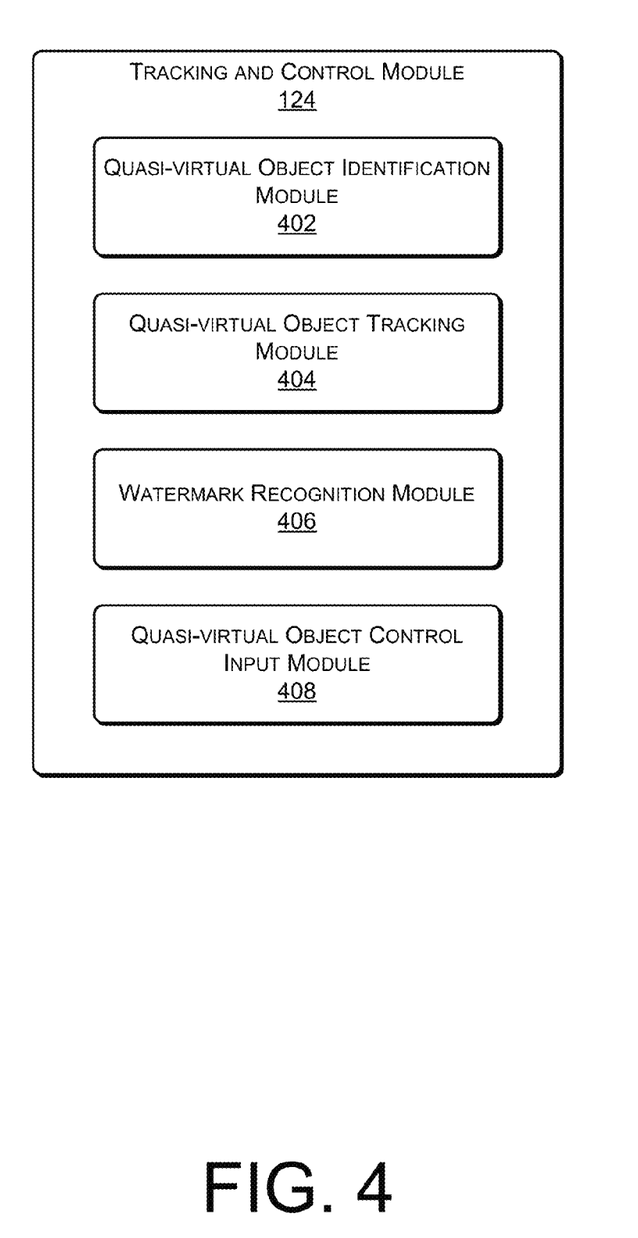
FIG. 4 is an illustrative diagram of a tracking and control module, such as that executed by the computing device shown in FIG. 1.

FIG. 4 shows one possible implementation of the tracking and control module 124 executed by the computing device 104 (FIG. 1) in more detail. The tracking and control module 124 accepts data from the spatial analysis module 114 as well as the other sensors within the environment to identify, track, and receive input from one or more QVOs within the scene.

Identification of a particular QVO within the environment allows for particular virtual overlays to be assigned to that particular object. For example, the environment may have a dozen QVO spheres. By uniquely identifying each of the QVO spheres within the environment, a different virtual overlay may be assigned to each of the QVO spheres.

The QVO identification module 402 identifies QVO's within the augmented reality environment. The process of identification may involve one or more active identification devices, passive machine readable tags, or a combination thereof. These devices or tags may be embedded within, disposed on, or otherwise coupled to the QVO.

The active identification device emits an identification signal detectable by the ARFN 102 or other components of the augmented reality system which the QVO identification module 402 may use to identify the QVO. For example, radio-frequency identification (RFID) tags, active optical transmitters, ultrasonic transmitters, and so forth generate signals which the ARFN 102 may receive and the QVO identification module 402 may interpret to identify the particular QVO.

Passive machine readable tags or markings may also identify the QVO in the augmented reality environment. The passive machine readable tags are configured to be scanned by sensors coupled to the ARFN 102 and provide resulting data to the QVO identification module 402 which is used to identify the particular QVO. For example, an optical tag such as a barcode may encode an identification string associated with the particular QVO.

The QVO identification module 402 may be configured to identify QVOs without active identification devices or passive machine readable tags. Using data acquired by the spatial analysis module 114, the QVO may be recognized by analysis of one or more attributes such as shape, dimensions, surface characteristics, starting position within the environment, user input, and so forth. For example, a user may construct a custom-built QVO shell without any active identification devices, tags, watermarks, and so forth. To identify the object as a QVO, the user may place the object within a pre-determined "QVO start zone" which is designated within the environment. The QVO identification module 402 may be configured to recognize the presence of the custom-built object within the pre-determined zone and accept this custom-built object as a QVO.

Once identified as a QVO, a QVO tracking module 404 determines a location and tracks the QVO as it moves within the augmented reality environment. In some implementations, the tracking module 404 may also determine and track an orientation of the QVO as well. The location of the QVO may be relative to other objects within the scene, or absolute. For example, the relative location may be that the QVO is between the wall and one of the ARFNs 102, while the absolute location may be that the QVO is at coordinates 2.3 meters "X" by 4.1 meters "Y" by 1.3 "Z" meters within the scene. Similarly, orientation may be relative to other objects or absolute.

The QVO tracking and control module 404 may determine the location and orientation using data from the spatial analysis module 114. As described above, the spatial analysis module 114 may use structured light or other techniques to locate objects including the QVOs and generate a model of the scene.

To facilitate tracking the QVO may include tracking targets. The tracking targets may be optical or non-optical. Optical tracking targets may be configured to be visible or non-visible to the user. For example, optical tracking targets comprising marks visible under infrared light may be disposed at one or more locations on a QVO. By imaging one or more of the marks with the camera 210, the QVO tracking module 404 determines the location and the orientation of the QVO. Non-optical tracking targets may comprise sound emitters, transponders, radio transmitters, magnetic field sensors, and so forth detectable by other sensors that are accessible QVO tracking module 404.

In some implementations the active identification devices, the passive machine readable tags, or the watermarks (described below) may also act as tracking targets. For example, an optical tag visible under infrared light which encodes a QVO identifier string may also act as a tracking target by the QVO tracking module 404.

A watermark recognition module 406 detects and interprets these watermarks. As mentioned above, the QVO may incorporate watermarks across at least a portion of its surface. Watermarks are features or markings with optical characteristics configured to be scanned by the augmented reality system, such as by the camera 210 of the ARFN 102. Watermarks may provide object identification, tracking targets, orientation detection, a known reference for use in gesture recognition, and so forth.

The watermarks may be disposed upon or under the surface of the QVO and may be visible or non-visible to the user. For example, in one implementation the watermarks which are scanned in the infrared wavelengths may be placed under a projection surface which appears white in visible wavelengths but is substantially transparent to infrared wavelengths, such that the watermarks are visible when scanned by the ARFN 102.

In some implementations, the watermarks may comprise a pseudorandom noise (PN) pattern. As described above, the PN pattern allows a particular point within the pattern to be determined. This allows for interpretation of gestures or movements of other objects relative to the QVO. For example, a finger of the user holding the QVO sphere occludes a portion of a watermark pattern disposed on the surface thereof. By scanning the watermark and determining what points of the PN pattern are not visible, the placement of the user's finger relative to the QVO may be determined.

As described above, the watermarks on the QVO may also contain information about the particular QVO. The watermark recognition module 404 may be configured to read this information and provide it to other modules within the system, such as the virtual overlay module 126, QVO identification module 402, and so forth. This information may include details such as a product number, version number, surface characteristics, presentation capabilities, dimensions, shape, and so forth. Where dimensional information is included, the embedded watermarks may be utilized to determine dimensions of other objects within the scene. Also shown is a quasi-virtual object control input module 408. The QVO control input module 408 is configured to use data about the location, orientation, motion, and so forth about the QVO to generate control inputs for the augmented reality environment. The QVO control input module 408 may also use data about other objects which interact with the QVO to generate input. For example, the user swiping their hand across a QVO sphere may cause the virtual overlay to appear to rotate. In some implementations the QVO control input module 408 may accept input from signaling devices within or associated with the QVO.

The QVO control input module 408 may also coordinate with the hazard avoidance function of the augmented reality module 122. For example, volumetric zones designated for input within the environment may be designated away from identified QVOs to avoid the user tripping or hitting the QVO. Where the QVO is in a location or orientation which is determined to be hazardous, the QVO control input module 408 may discontinue accepting input associated with the QVO.

Figure 5:
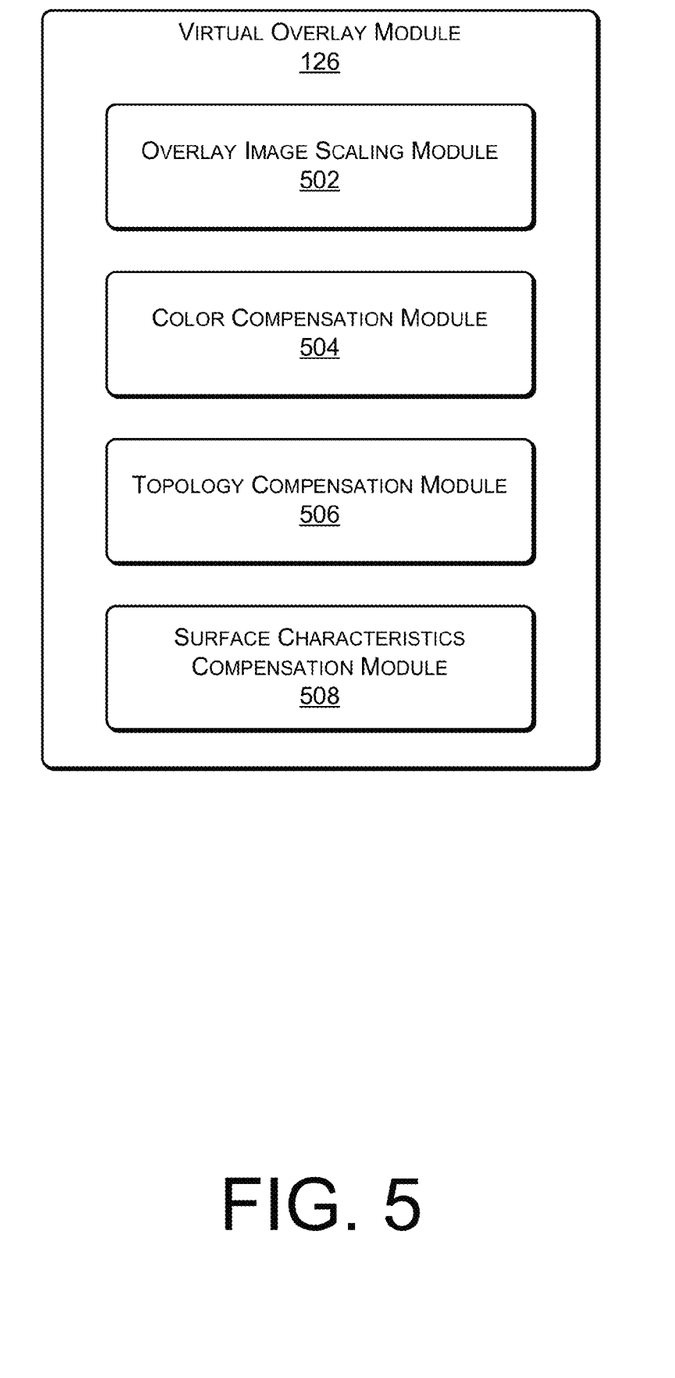
FIG. 5 is an illustrative diagram of the virtual overlay module of FIG. 1.

FIG. 5 shows more detail of one possible implementation of the virtual overlay module 126 executed on the computing device 104 of FIG. 1. The augmented reality system may provide a pristine image for use as a virtual overlay on a QVO. However, the pristine image may need to be modified to provide the user with a virtual overlay adapted for the QVO. The virtual overlay module 126 is configured to provide this functionality.

An overlay image scaling module 502 is provided as part of the virtual overlay module 126 to modify the pristine image to account for the size of the QVO. For example, when presenting a map globe on a spherical QVO, the map globe is scaled such that the image of the map will appear to fill, but not exceed, the surface of the sphere. As mentioned above, the dimensions of the QVO may be determined by the spatial analysis module 114 or via data obtained from the watermark recognition module 404.

The virtual overlay module 126 may further include a color compensation module 504 configured to alter the color values of the presented virtual overlay. This alteration of color may be in response to the color of the QVO surface, ambient light conditions, and so forth. The color compensation module 504 may be configured to attempt to render the best color available relative to the pristine image, or shift colors to improve visibility. For example, suppose the augmented reality system is configured to present a paragraph of text which includes yellow highlights on a paper tablet. Where the paper of the tablet is an ivory color, the color compensation module 504 may intensify the yellow highlights such that they remain visible upon projection. However, when the paper of the tablet is a canary yellow, it may not be possible to adjust the color values such that the yellow highlights are visible. In such a case, the color compensation module 504 may translate colors. For example, the yellow highlights may be translated into green highlights to maintain visibility.

QVOs may be provided in a variety of shapes. These shapes may be simple, such as a sphere, placemats, carpets, or complex, such as drapes, tools, and so forth. Presenting the pristine image of the virtual overlay upon a varied topology of the QVO may result in a distortion when viewed by the user. For example, presentation of a flat image on a sphere results in a distorted image. A topology compensation module 506 is configured to alter the virtual overlay image to account for the topology of the QVO.

A surface characteristics compensation module 508 may be provided. The surface characteristics compensation module 508 is configured to alter the virtual overlay to account for surface characteristics. Surface characteristics include visible markings such as visible light watermarks, text, logos, graphics, and so forth. For example, suppose a QVO sphere has printed on its surface watermarks in the form of light green markings. The module 508 is configured to alter the virtual overlay such that pixels which overlay these markings will have less green. When the virtual overlay so compensated is presented on the QVO, the green markings are less visible to the user. The module 508 may thus modify the virtual overlay to compensate for and conceal the watermarks.

In some implementations the surface characteristics module 508 may be configured to prevent presentation of an image in areas which are occluded by a user. For example, the portions of the QVO sphere which are occluded by the user's hand which holds the sphere may configured such that the projector 206 does not project onto those portions. This prevents the virtual overlay from appearing on the back of the user's hand.

The QVOs may present images via a display system. This display system may include an internal projector, conformal display, and so forth. The conformal display may comprise electrophoretic, interferometric, electrowetting, liquid crystal, light emitting diode, or other elements configured to present an image. In some implementations, the projection and the display system may be combined. For example, a conformal electrophoretic display may provide static elements of the virtual overlay while a projector may provide dynamic elements of the virtual overlay.

Figure 6:
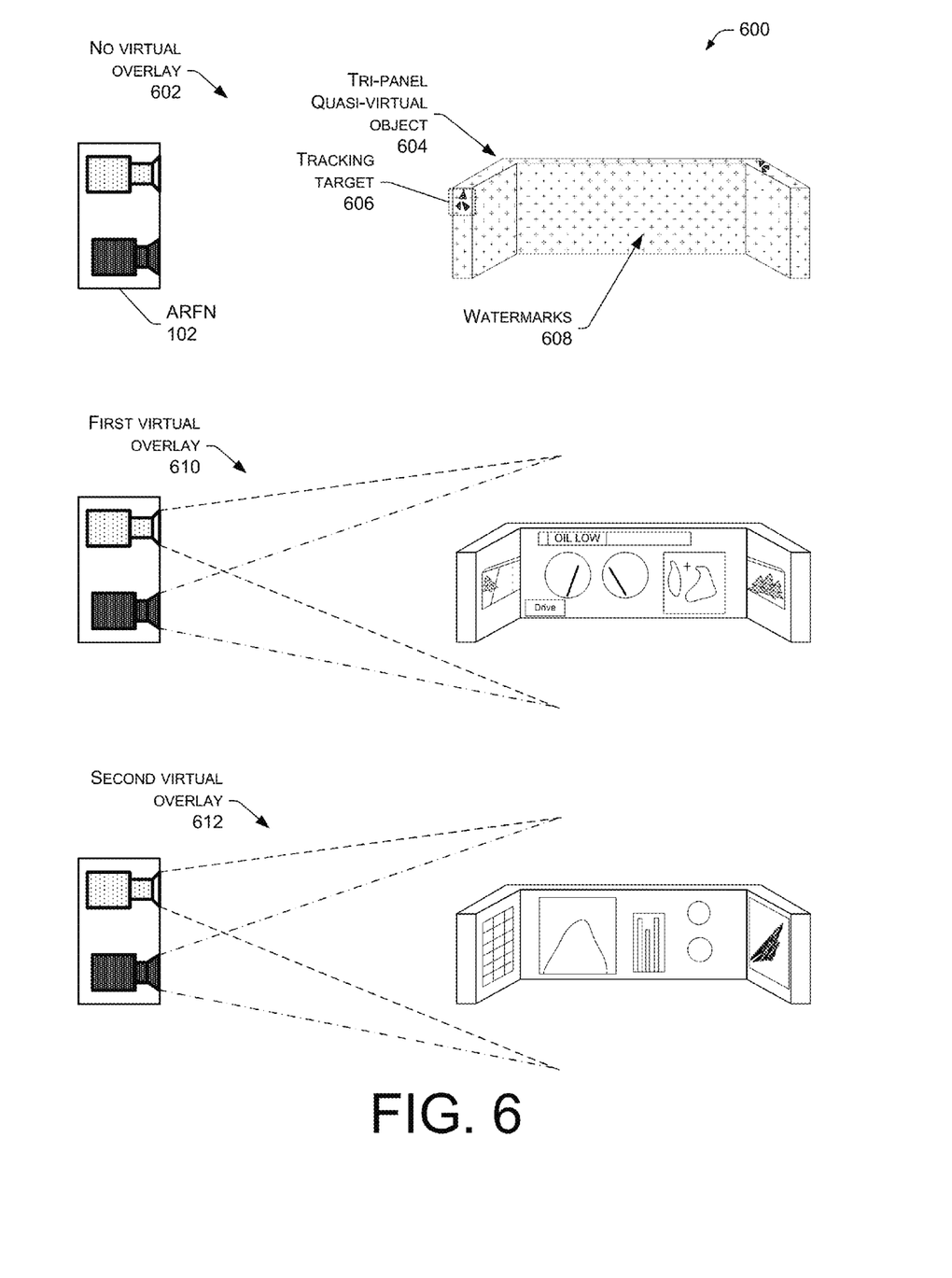
FIG. 6 shows a series of illustrations of virtual overlays being projected onto quasi-virtual objects.

FIG. 6 is an illustration of projecting virtual overlays on the quasi-virtual objects 700. In one implementation, the QVO may comprise a shell with a diffusely reflective surface. This shell may comprise a plastic, ceramic, metal, and so forth. In some implementations, the QVO may incorporate signaling devices such as infrared transmitters, radio transmitters, ultrasonic clickers, and so forth. These signaling devices may be used to provide user input. In other implementations, the QVO may be passive, free from active electronics.

In this illustration, at 602, no virtual overlay is applied to a tri-panel quasi-virtual object 604 is shown. In this illustration, one or more tracking targets 606 are shown disposed upon the QVO 604. Watermarks 608 are also distributed across the surface of the QVO 604. As described above, the watermarks 608 may be configured such that they are detectable with non-visible light, and no with visible light to render them invisible to the user. Or, where the watermarks or other marks are visible, the surface characteristics compensation module 508 may adjust the virtual overlay such that the watermarks 608 are subsumed within. As also described above, the active identification device, such as an RFID tag (not shown), may be incorporated into the QVO 604.

At 610, a first virtual overlay is projected onto the QVO 604. In this illustration, the first virtual overlay resembles an automotive cockpit. The user may move the QVO 604 around within the environment, while the first virtual overlay 610 appears to remain in place on the surface of the QVO 604. The tracking and control module 124 is configured to accept gestures such as a flick of the fingers as inputs which activate virtual "switches" presented on the QVO 604. The QVO 604 thus provides physicality to an otherwise virtual presentation.

At 612, a second virtual overlay is applied to the same QVO 604, thereby changing the virtual reality. In this example, the second virtual overlay resembles an aircraft cockpit. Within the augmented reality environment, the QVO 604 is a mutable object. Thus, as shown here, the QVO 604 may be easily reconfigured from a blank slate to an automotive cockpit to an aircraft cockpit in moments.

It is understood that the tri-fold QVO 604 is not limited to use in the presentation of vehicular controls. For example, the QVO 604 may be configured to present a blank virtual painting canvas in the center with virtual pallets of color paint on either side.

Figure 7:
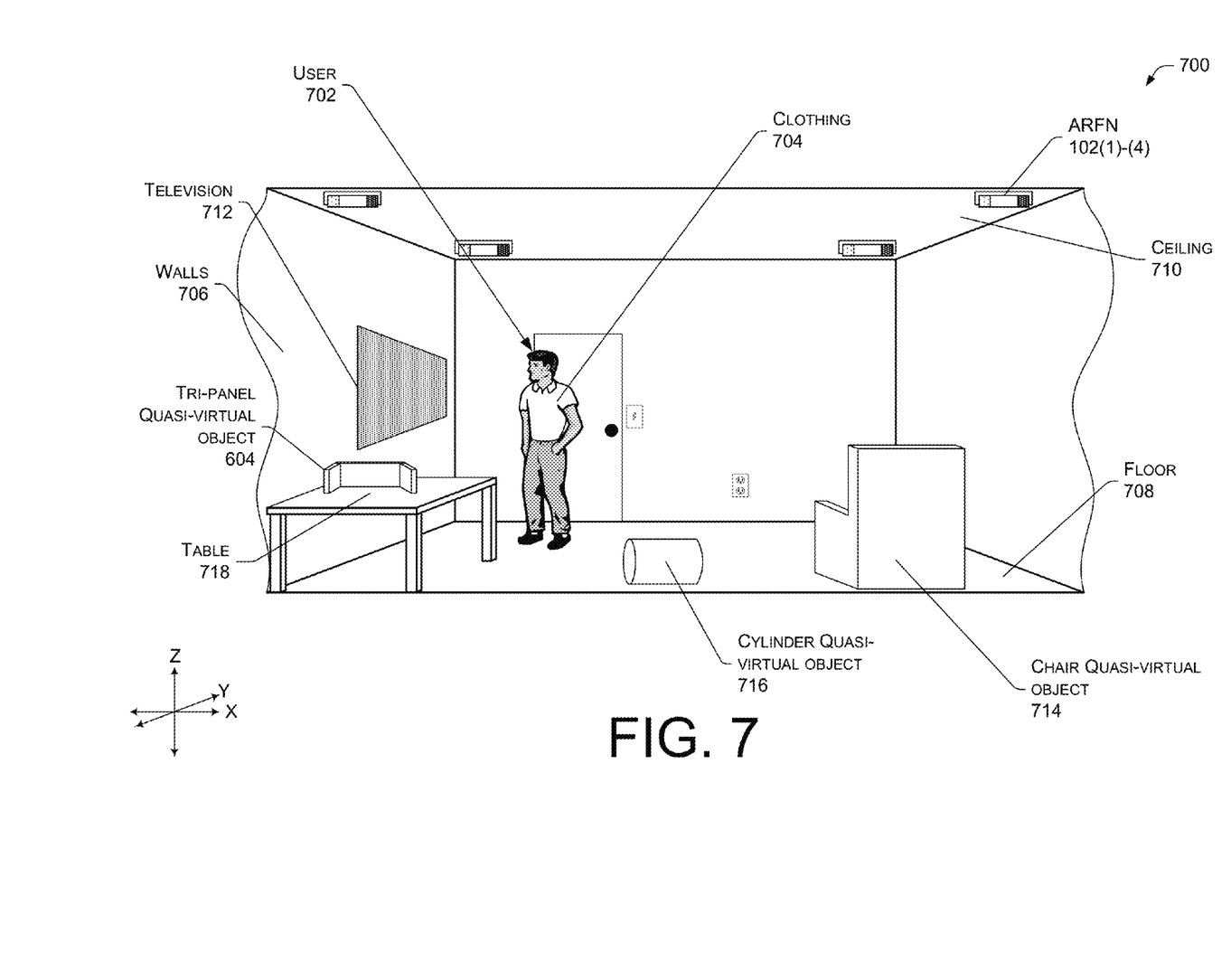
FIG. 7 is a detailed perspective view of an illustrative augmented reality environment with quasi-virtual objects.

FIG. 7 is a detailed perspective view of an illustrative augmented reality environment 700 with quasi-virtual objects when no virtual overlays are applied. A user 702 wearing clothing 704 is standing within the room enclosed by walls 706 and standing on a floor 708. While a single user 702 is shown, it is understood that the augmented reality environment may support multiple users. Above is a ceiling 710 upon which several ARFNs 102 are mounted. While four ARFNs 102 are shown mounted in the approximate corners of the ceiling 710, more or fewer ARFNs 102 may be used in other implementations, and such ARFNs may be distributed to other locations of the ceiling 1710, on the walls 706, tables, and so forth.

Disposed on one of the walls 706 is a television 712 or computer display. Sitting in one corner of the room on the floor is a chair quasi-virtual object 714 suitable for a single adult person. Sitting on the floor is a cylinder QVO 716. Sitting in another corner of the room is a table 718. Resting upon the table 718 is the tri-panel quasi-virtual object 604 of FIG. 6.

As shown here, without the virtual overlays, the scene is somewhat featureless. However, the augmented reality system may be configured to alter the presentation of quasi-virtual objects and other objects within the room.

Figure 8:
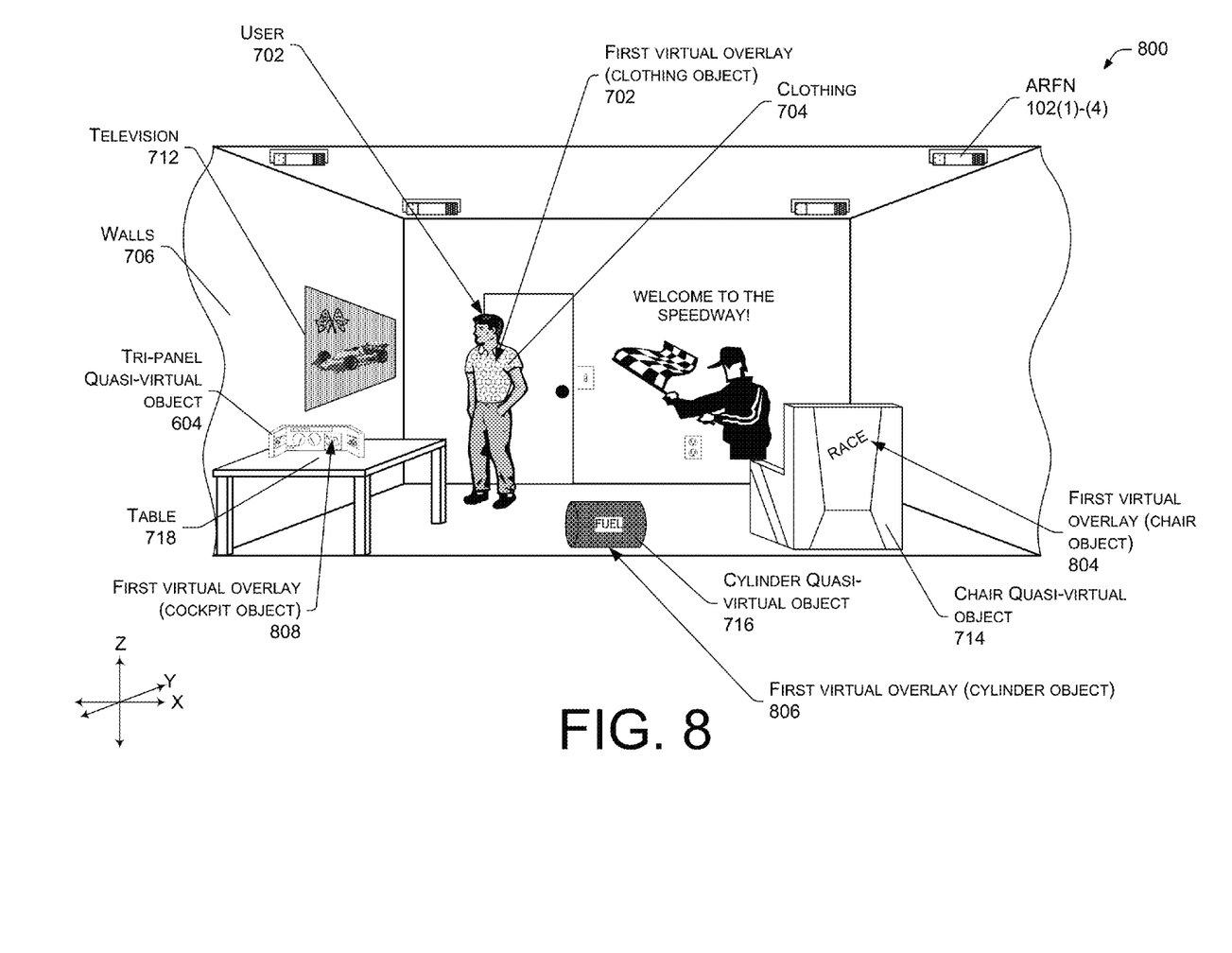
FIG. 8 is a detailed perspective view of the illustrative augmented reality environment with a first set of virtual overlays presented on the quasi-virtual objects.

FIG. 8 is a detailed perspective view of the illustrative augmented reality environment 800 with a first set of virtual overlays presented on the quasi-virtual objects. Compared to the environment in FIG. 7, the augmented reality environment here is much richer. For the purposes of illustration, assume that the user 702 has selected to engage an augmented reality environment involving automotive racing.

A first virtual overlay 802 has been applied to the clothing 704 of the user 702, providing the user with appropriate garb for this augmented environment. For example, the user 702 may be provided with an augmented reality "racing suit" covered with sponsor patches. A first virtual overlay 804 is applied to the chair QVO 714, converting the featureless chair into a seat for a race car selected by the user 702.

Rather than a plain cylinder, the cylinder QVO 716 now has a first virtual overlay 806 applied making it appear to be a fuel tank. As described above, QVOs may be used as input devices. For example, in the automotive racing environment, the user 702 may work with a "virtual pit crew" to refuel the car by picking up and manipulating the cylinder QVO 716.

The tri-panel QVO 604 has been modified with a first virtual overlay 808 such that it appears to be an automotive cockpit containing appropriate gauges, maps, rear-view mirrors, and so forth. By sitting in the chair QVO 714 and placing the tri-panel QVO 604 in front of him, the user 702 may be immersed in the racing environment. This immersion is further aided by the presentation of images on the walls and television 712, as well as sound from speakers.

Figure 9:
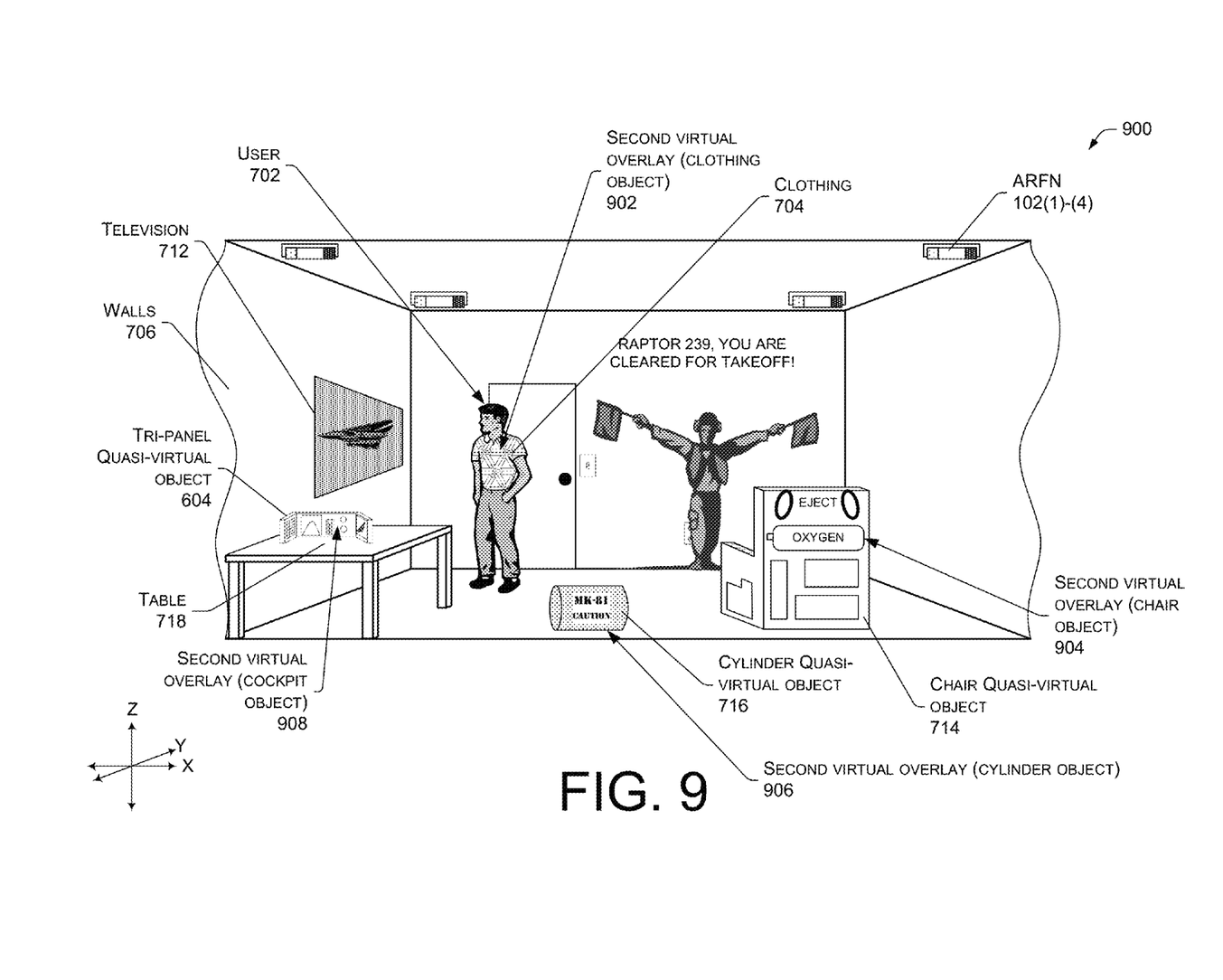
FIG. 9 is a detailed perspective view of the illustrative augmented reality environment with a second set of virtual overlays presented on the quasi-virtual objects.

FIG. 9 is a detailed perspective view of the illustrative augmented reality environment with a second set of virtual overlays presented on the quasi-virtual objects 900. The QVOs provide physical presence to virtual objects, while maintaining the ability to rapidly reconfigure. In this illustration, the user 702 has chosen to instead participate in a military aviation simulation.

New virtual overlays have been applied to the QVOs, rendering them into "new" objects to the user. A second virtual overlay 902 has been applied to the user's clothing 704, for example transforming it into a "flight suit" with the user's nametag and wings. A second virtual overlay 904 transforms the chair QVO 714 into an ejection seat from a high-performance aircraft. The cylinder QVO 716 now appears to be a bomb due to a second virtual overlay 906. Likewise, a second virtual overlay 908 on the tri-panel QVO 604 now shows the controls associated with the high-performance aircraft. Thus, in moments the nature of the scene and the objects within have been changed.

Figure 10:
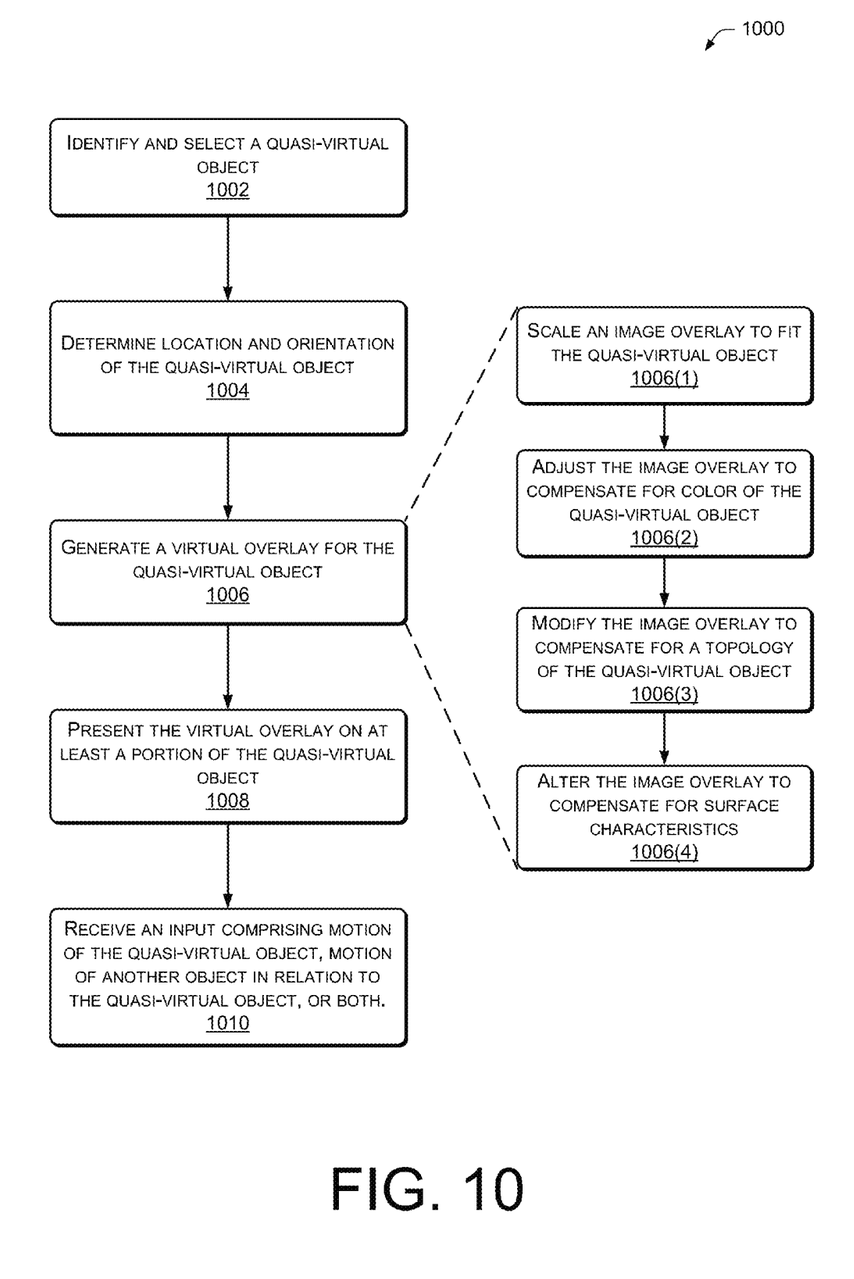
FIG. 10 is an illustrative process of presenting a virtual overlay on at least a portion of a quasi-virtual object within the augmented reality environment.

FIG. 10 is an illustrative process 1000 of presenting a virtual overlay on at least a portion of a quasi-virtual object within the augmented reality environment. The processes described herein may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

At 1002, a quasi-virtual object is identified and selected for application of a virtual overlay. In some implementations the identification may include receiving input from an object identification tag associated with the quasi-virtual object, scanning a watermark, and so forth.

At 1004, a location and orientation of the quasi-virtual object within the environment may be determined. As described above, this may include scanning the scene with the structured light pattern from the ARFN 102.

At 1006, a virtual overlay is generated for the quasi-virtual object. Generating the virtual overlay may include several steps: An image overlay may be scaled to fit the quasi-virtual object 1006(1). The image overlay may be adjusted to compensate for color of the quasi-virtual object 1006(2). The image overlay may be modified to compensate for a topology of the quasi-virtual object 1006(3). The image overlay may also be altered to compensate for surface characteristics 1006(4).

At 1008, the virtual overlay is presented on at least a portion of the quasi-virtual object. In one implementation, the presentation may include directing a projector to project an image of the virtual overlay onto at least a portion of the quasi-virtual object. In another implementation, a conformal display on a surface of the quasi-virtual object may be directed to present an image of the virtual overlay. In some implementations, a combination of projection and display may be used.

At 1010, an input is received which comprises motion of the object, motion of another object in relation to the object, or both. For example, the user may make a swiping motion of a hand or finger proximate to the surface of the spherical QVO which is interpreted as an input to rotate the map globe.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. An augmented reality system comprising:
    a processor;
    a projector and a camera coupled to the processor;
    a moveable quasi-virtual object configured to present an image from the projector;
    an augmented reality module coupled to the processor, the projector, and the camera, the augmented reality module comprising:
        a tracking and control module configured to:
            determine that an object resides within an environment;
            identify the object as the quasi-virtual object; and
            track the quasi-virtual object within the environment; and
        a virtual overlay module configured to:
            generate a virtual overlay image to alter an appearance of the quasi-virtual object;
            cause a modification to the virtual overlay image based at least partly on a determination that the quasi-virtual object is within a predetermined distance from a different object; and
            cause a second modification to the different object based at least partly on the determination that the quasi-virtual object is within the predetermined distance from the different object, the second modification to the different object including projecting a cautionary virtual overlay onto at least a portion of the different object.

2. The system of claim 1, the quasi-virtual object further comprising a plurality of watermarks configured to be imaged by the camera.

3. The system of claim 2, wherein:
    the watermarks are configured to be imaged with a non-visible wavelength of light; or
    the watermarks comprise a pseudorandom noise pattern.

4. The system of claim 1, wherein the quasi-virtual object comprises a passive plastic shell.

5. The system of claim 1, further comprising a receiver coupled to the processor and wherein the quasi-virtual object comprises an active identification device configured emit a signal for receipt by the receiver which, when interpreted by the tracking and control module, uniquely identifies the quasi-virtual object.

6. The system of claim 5, wherein the active identification device comprises a radio-frequency identification tag.

7. The system of claim 1, wherein the quasi-virtual object comprises a machine readable tag configured to be scanned by the camera and which encodes a unique identifier which, when interpreted by the tracking and control module, identifies the quasi-virtual object.

8. The system of claim 1, wherein the augmented reality module further comprises a structured light module configured to scan the quasi-virtual object with structured light.

9. The system of claim 1, wherein the tracking and control module is further configured to determine an orientation of the quasi-virtual object.

10. The system of claim 1, wherein the augmented reality module is further configured to modify one or more features of the environment as one or more users approach one or more physical hazards.

11. The system of claim 1, wherein the tracking and control module is further configured to determine that the object initially resides within a first zone of multiple zones of the environment, the first zone being a designated zone in which the tracking and control module detects objects within the environment, wherein the camera is configured to capture a first image and a second image that each depicts the first zone, and wherein the tracking and control module is further configured to:
    determine that the first image does not include the object within the first zone;
    determine that the second image includes the object within the first zone; and
    identify the object as the quasi-virtual object based at least partly on at least one of a shape of the object, dimensions of the object, surface characteristics of the object, or a position of the object within the first zone.

12. The system of claim 1, wherein the objects are not detectable by the tracking and control module within a second zone of the multiple zones.

13. The system of claim 1, wherein the modification to the virtual overlay image includes adjusting a brightness level of the virtual overlay image, the brightness level of the virtual overlay image incrementally decreasing as a distance between the quasi-virtual object and the different object decreases.

14. The system of claim 1, further comprising a speaker that outputs sound that is associated with the virtual overlay image, wherein the modification to the virtual overlay image includes adjusting a volume of the sound.

15. The system of claim 14, wherein the volume of the sound incrementally decreases as a distance between the quasi-virtual object and the different object decreases.

16. The system of claim 1, wherein the virtual overlay module is further configured to prevent presentation of the virtual overlay image in one or more areas that are occluded by a user.

17. One or more non-transitory computer-readable media storing computer-executable instructions that, when executed, cause one or more processors to perform acts comprising:
    identifying an object as a quasi-virtual object for application of a virtual overlay;
    determining a location and an orientation of the quasi-virtual object in an augmented reality environment;
    generating the virtual overlay for the quasi-virtual object;
    presenting the virtual overlay on at least a portion of the quasi-virtual object; and
    causing a modification to the virtual overlay based at least partly on a determination that the quasi-virtual object is within a predetermined distance from a different object, the modification to the virtual overlay including adjusting a brightness level of the virtual overlay, the brightness level of the virtual overlay decreasing as a distance between the quasi-virtual object and the different object decreases.

18. The one or more non-transitory computer-readable storage media of claim 17, wherein the identifying the quasi-virtual object comprises receiving data from an object identification tag or a watermark associated with the quasi-virtual object.

19. The one or more non-transitory computer-readable storage media of claim 17, wherein the determining the location and the orientation for the quasi-virtual object comprises scanning a scene including the quasi-virtual object with a structured light pattern.

20. The one or more non-transitory computer-readable storage media of claim 17, wherein the presenting comprises directing a projector to project an image of the virtual overlay onto at least a portion of the quasi-virtual object.

21. The one or more non-transitory computer-readable storage media of claim 17, wherein the presenting comprises directing a conformal display on a surface of the quasi-virtual object to present an image of the virtual overlay.

22. The one or more non-transitory computer-readable storage media of claim 17, wherein the generating the virtual overlay comprises:
   scaling an image overlay to fit the quasi-virtual object;
   adjusting the image overlay to compensate for color of the quasi-virtual object; and
   modifying the image overlay to compensate for a topology of the quasi-virtual object.

23. The one or more non-transitory computer-readable storage media of claim 17, wherein the generating the virtual overlay comprises modifying the virtual overlay to compensate for and conceal visible light watermarks on the quasi-virtual object.

24. One or more non-transitory computer-readable media storing computer-executable instructions that, when executed, cause one or more processors to perform acts comprising:
   identifying a first object by determining that the first object is currently located within an environment;
   generating a virtual overlay for the first object based at least in part on the first object residing within the environment;
   presenting the virtual overlay on at least a portion of the first object;
   tracking the first object to present the virtual overlay on at least a portion of the first object during movement of the first object within the environment; and
   causing a modification to the virtual overlay based at least partly on a determination that the first object is within a predetermined distance from a second object, the modification to the virtual overlay including adjusting a brightness level of the virtual overlay, the brightness level of the virtual overlay decreasing as a distance between the first object and the second object decreases.

25. The one or more non-transitory computer-readable storage media of claim 24, further comprising determining a location and orientation of the first object at least in part by scanning a scene including the first object with a structured light pattern.

26. The one or more non-transitory computer-readable storage media of claim 24, further comprising adjusting the virtual overlay to compensate for a color of the first object.

27. The one or more non-transitory computer-readable storage media of claim 24, further comprising determining an orientation of the first object via one or more tracking targets disposed on the first object.

28. The one or more non-transitory computer-readable storage media of claim 24, wherein the presenting the virtual overlay comprises projecting at least a portion of the virtual overlay onto the first object.

29. The one or more non-transitory computer-readable storage media of claim 24, wherein the presenting the virtual overlay on at least a portion of the first object comprises sending at least a portion of the virtual overlay to the first object for presentation on a display.

* * * * *